INVENTOR
Franz Josef Rohr

United States Patent Office 3,505,114
Patented Apr. 7, 1970

3,505,114
ELECTRIC BATTERY COMPRISING A PLURALITY OF SERIES CONNECTED FUEL CELLS WITH SOLID ELECTROLYTE
Franz Josef Rohr, Ober Abtsteinach, Germany, assignor to Aktiengesellschaft Brown, Boveri & Cie, Baden, Switzerland, a joint-stock company
Filed Feb. 26, 1968, Ser. No. 708,369
Claims priority, application Germany, Mar. 18, 1967, B 91,680
Int. Cl. H01m 27/10, 27/02
U.S. Cl. 136—86                                   6 Claims

ABSTRACT OF THE DISCLOSURE

A battery comprises a stack of fuel cells connected electrically in series. Each cell in the stack which is separated from an adjacent cell by a metallic disc is comprised of a disc of solid electrolyte to the opposite faces of which metallic electrodes are applied and which is located within the opening in an annular ring of asbestos felt, and annular current take-off rings made from silver impregnated asbestos felt applied to the opposite faces of the ring of asbestos felt, the inner diameter of these current take-off rings being less than the diameter of the solid electrolyte disc and contacting the latter in order to establish a support for the solid electrolyte disc. A system of communicating bores is established through the stack of cells for the necessary circulation of the reaction gases e.g. oxygen and hydrogen through the gas-tight spaces formed on opposite sides of the solid electrolyte disc by the central spaces within the annular current take-off rings.

---

Figure 1:
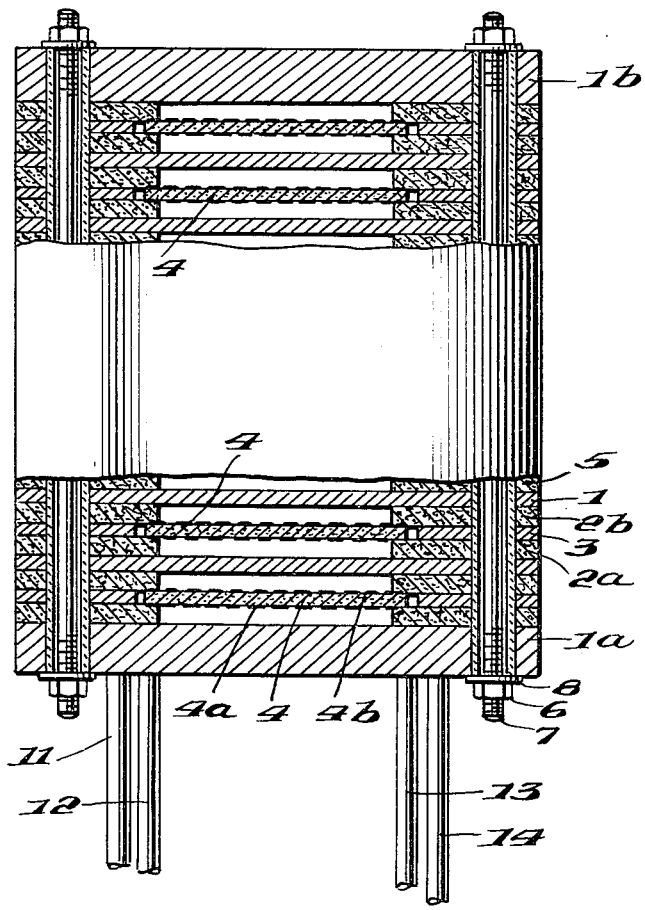

The present invention relates to a battery comprised of series-connected fuel cells with solid electrolyte which is provided on both sides with metal electrodes and current take-offs.

As is known, fuel cells serve for the direct conversion of chemical energy into electrical energy. In the case of fuel cells with a solid electrolyte and having a working temperature of 1000° C., oxygen (in pure form or in the form of air) is introduced for this purpose to one electrode, and a fuel (for example hydrogen, hydrocarbon or carbon monoxide) is introduced to the other electrode. The oxygen takes up electrons on its electrode, migrates in the form of a twice negatively charged ion through the solid electrolyte, and reacts on the other electrode with the fuel, for example, with hydrogen to form water, simultaneously giving up electrons. A potential difference between the two electrodes builds up in this way, so that current flows in a connected load circuit.

However, these high working temperatures, which are required for good mobility of the oxygen ions, are attended by technological difficulties when operation takes place for a relatively long time. Cracks forming in the individual cells in the electrolyte lead to the oxygen and fuel spaces becoming short-circuited, while the vacuum-tight joints between the ceramic and metal components come undone. It has accordingly been proposed to have fuel cells or batteries made entirely of ceramic except for the electrodes and current take-offs, the components being joined to one another in gas-tight fashion by means of enamel, glass or ceramic cement. However, such arrangements are sensitive to temperature and fracture.

Solid electrolytes are known for the purpose of avoiding these technological difficulties, and they do indeed allow of a working temperature of 800° C., but exhibit less mobility for oxygen ions, which furthermore become worse in the course of time. There is accordingly a continuous increase in the internal resistance of such fuel cells.

A solid electrolyte has already been proposed which retains its high ion mobility for oxygen even at these relatively low temperatures for an unlimited time, and is thus free of any aging phenomena.

A structural material consisting essentially of electrically insulating asbestos-felt has been proposed in order to eliminate the above-mentioned technological disadvantages regarding metal-to-ceramic connections. This felt is made electrically conductive by introducing dispersed metals, and can, for example, serve as a gasket and current take-off.

The problem underlying the invention is to make use of this structural material and the above-named electrolyte in combining fuel cells to make batteries in such a manner that they do not exhibit the disadvantages set out above. The invention is characterized in that the solid electrolyte of each cell, including the associated metal electrodes, is made in disc form and arranged inside an insulating ring of asbestos-felt while forming between them an expansion gap, and in that the current take-offs are made in the form of silver-impregnated asbestos-felt rings which cover, on the one hand, the insulating ring of asbestos-felt and, on the other hand, an edge zone of the solid electrolyte, in such a manner that in conjunction with stacked metal discs, gas-tight spaces are formed on both sides of the solid electrolyte.

All the metal discs and asbestos-felt rings comprise axial and coincident bores for retainer bolts and for introducing the reaction gases. These metal discs furthermore include in alternating sequence radial bores which branch off from the axial bores for the reaction gases to the gas-spaces. The individual fuel cells of the battery according to the invention are furthermore stacked in such a manner that neighboring cells have a metal disc in common. In order to center the battery and clamp it in gas-tight fashion, screw bolts guided in ceramic sleeves are arranged in the bores provided for that purpose.

In addition, pipes are connected to the relevant bores on the outside of one cover-plate for the purpose of introducing the reaction gases, while the other cover-plate comprises axial and radial bores only for the purpose of introducing the reaction gases into the neighboring gas-tight space.

FIG. 1 of the accompanying drawings illustrates one particular example of embodiment of a battery according to the invention, fed with hydrogen and oxygen, the view being partly in elevation and partly in central vertical section.

Figure 2:
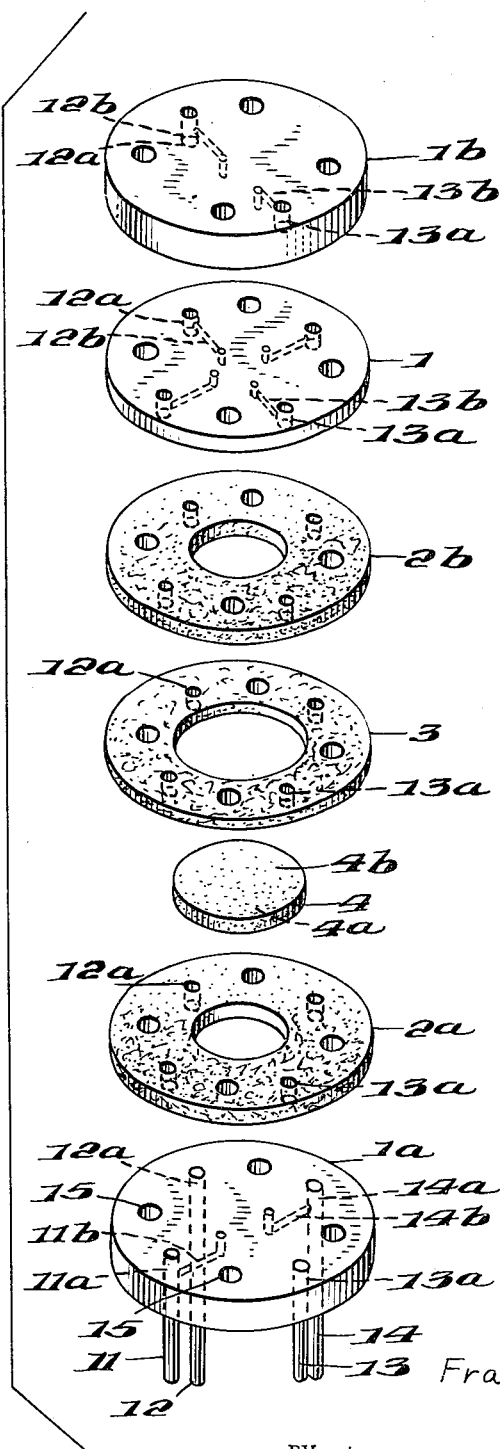

FIG. 2 shows an exploded view of the individual components before assembly.

As will be seen from the cut-away view in FIG. 1, each cell in the stack is seen to be constituted by a disc 4 of solid electrolyte to the opposite faces of which metallic electrodes 4a and 4b are applied by any suitable means such as, for example, the plasma-spray process in the form of porous nickel and silver coatings, respectively, and are in contact with hydrogen and oxygen respectively while the battery is in operation. Each disc-shaped solid electrolyte component 4 is arranged inside of and co-planar with an annular insulating ring 3 made from asbestos-felt, the diameter of the electrolyte disc 4 being somewhat smaller than the inner diameter of the annular ring 3 so as to provide an annular gap therebetween to allow for radial expansion of the electrolyte disc 4.

Current take-offs are provided on opposite sides of each solid electrolyte disc 4 and its surrounding insulating ring 3, the current take-offs being in the form of silver-impregnated annular rings 2a, 2b made from asbestos-felt, the internal diameter of these rings 2a, 2b being smaller than the diameter of the electrolyte disc 4. In this manner, each electrolyte disc is held on both sides in an annular edge zone, while at the same time, electrical contact between the electrode coatings 4a, 4b on opposite sides of the electrolyte disc 4 and the current take-off rings 2a, 2b is ensured. These impregnated annular rings of asbestos-felt which thus serve as current take-offs and also as gaskets form, together with metallic discs 1a, 1b placed at opposite ends of the stack of cells, and intermediate metallic discs 1 between each cell, i.e. between adjacent electrolyte discs 4, a gas-tight space into which the hydrogen and oxygen are introduced.

For the purpose of introducing hydrogen and oxygen, axial bores 11a, 14a, and 12a, 13a in the metal discs 1, 1a, 1b are connected with radial bores 11b, 14b and 12b and 13b which open out into the gas-tight spaces between the silver-impregnated asbestos-felt rings 2a, or 2b respectively and the solid electrolyte discs 4. These axial bores 11a, 14a and 12a, 13a are likewise present in the asbestos-felt rings 3 so that the gas-tight spaces for the relevant reaction gas, for example, hydrogen or oxygen, are linked so as to communicate with one another.

Pipes 11, 14 and 12, 13, which serve to introduce and remove the hydrogen or water and the oxygen, are connected on the face of the metallic cover-plate 1a to the axial bores 11a, 14a and 12a, 13a therein. Both reaction gases flow through the corresponding gas-spaces while the battery is in operation. The metallic cover-plate 1b comprises only axial and radial bores 12a, 12b and 13a, 13b, since there is only one gas-space on the side disposed towards the battery.

Each metal disc 1 separates from one another two spaces to which hydrogen and oxygen are introduced. At the same time, it connects the individual fuel cells in series electrically.

Contacts, not shown in FIG. 1, for the load circuit are fitted to the cover-plates 1a, 1b at opposite ends of the stack of series connected cells which constitute the battery. The cells are clamped in gas-tight fashion by means of the threaded bolts 6 and nuts 7 which are insulated from the cells by the ceramic tubes 9 and washers 8, so that no electrical short-circuit occurs.

The battery according to the invention is distinguished from known arrangements principally in that the gas-tight joints between its components are made by means of asbestos-felt rings which also serve as current take-offs. The individual fuel cells are elastically linked to one another in this manner, so that damage by mechanical stresses is, to a large extent, excluded. Since they are furthermore not welded to one another, a defective cell can easily be replaced.

I claim:

1. A battery comprising a stack of fuel cells connected together in series, each cell in said stack being separated from an adjacent cell by a metallic disc and being comprised of a disc of solid electrolyte having metallic electrodes applied to the opposite faces thereof, said electrolyte disc being located within the opening in a first annular ring of asbestos-felt, the diameter of said electrolyte disc being less than the inner diameter of said annular asbestos-felt ring in order to establish a circular expansion gap therebetween, and second and third annular current take-off rings in the form of silver impregnated asbestos-felt applied respectively to the opposite faces of said first annular ring, the inner diameter of said second and third annular rings being less than the diameter of said solid electrolyte disc and having one side in contact with opposite sides of said electrolyte disc to establish a peripherally extending support for the edge portion of said electrolyte disc, the other sides of said second and third annular rings being in contact respectively with said metallic discs which separate adjacent cells in the stack, and a system of communicatnig bores established through said stack of cells for circulating the reaction gases such as for example oxygen and hydrogen through gas-tight spaces formed between said metallic separator discs and opposite sides of said electrolyte discs by the central spaces within said annular current take-off rings.

2. A battery as defined in claim 1 wherein said metal discs and asbestos-felt rings include axial and coincident bores for receiving retainer bolts holding the cells together in stacked relation and for also introducing the reaction gases.

3. A battery as defined in claim 1 wherein said metal discs which separate adjacent cells in the stack include in alternating sequence radial bores which branch off from axial bores therethrough for introducing the reaction gases into said gas-tight spaces on opposite sides of said electrolyte discs.

4. A battery as defined in claim 3 wherein adjacent cells in said stack have a metallic disc common thereto.

5. A battery as defined in claim 1 wherein said metal discs and said first, second and third asbestos-felt rings include axial aligned bores extending through the entire stack, ceramic sleeves lining said bores, and retainer bolts passed through said liner sleeves for securing all of the cells in the stack together.

6. A battery as defined in claim 1 wherein the endmost metallic discs at opposite ends respectively of the stack of cells constitute cover plates for the stack, one said cover plate having supply pipes connected to the relevant axial bores for the purpose of introducing said reaction gases, and the other said cover plate having axial and radial bores only for the purpose of introducing the reaction gases into the neighboring gas-tight space.

References Cited

UNITED STATES PATENTS 3,442,714    5/1969    Matsuno _____ 136—86

FOREIGN PATENTS 6,609,546    3/1967    Netherlands.

ALLEN B. CURTIS, Primary Examiner